United States Patent
Morassi et al.

(10) Patent No.: US 11,331,753 B2
(45) Date of Patent: May 17, 2022

(54) SIMULTANEOUS LASER WELDING EQUIPMENT OF A VEHICLE LIGHT

(71) Applicant: MARELLI AUTOMOTIVE LIGHTING ITALY S.P.A., Turin (IT)

(72) Inventors: Silvano Morassi, Turin (IT); Igor Di Vora, Turin (IT); Melchiade Agostini, Turin (IT); Domenico Ferigo, Turin (IT); Marco Valle, Turin (IT); Cristian Segalla, Turin (IT)

(73) Assignee: MARELLI AUTOMOTIVE LIGHTING ITALY S.P.A., Turin (IT)

(*) Notice: Subject to any disclaimer, the term of this patent is extended or adjusted under 35 U.S.C. 154(b) by 160 days.

(21) Appl. No.: 16/158,535

(22) Filed: Oct. 12, 2018

(65) Prior Publication Data

US 2019/0111519 A1 Apr. 18, 2019

(30) Foreign Application Priority Data

Oct. 12, 2017 (IT) .................. 102017000114962

(51) Int. Cl.
| | | |
|---|---|---|
| *B23K 26/282* | (2014.01) | |
| *B29C 65/16* | (2006.01) | |
| *B29C 65/00* | (2006.01) | |
| *F21S 43/27* | (2018.01) | |
| *F21S 41/29* | (2018.01) | |

(Continued)

(52) U.S. Cl.
CPC ........ *B23K 26/282* (2015.10); *B23K 26/0648* (2013.01); *B23K 26/127* (2013.01);
(Continued)

(58) Field of Classification Search
CPC ...... B23K 26/282; B23K 26/30; B29C 65/167
(Continued)

(56) References Cited

U.S. PATENT DOCUMENTS 6,832,020 B2 * 12/2004 Okada ................ G02B 6/29358
  359/868
7,619,712 B2 * 11/2009 Lai .................... G02F 1/133528
  349/162

(Continued)

FOREIGN PATENT DOCUMENTS

| CN | 104985324 B | 6/2016 |
|---|---|---|
| EP | 2923819 A1 | 9/2015 |

(Continued)

OTHER PUBLICATIONS

Search Report for Italian Patent Application No. 201700114962 dated Jun. 26, 2018.

(Continued)

*Primary Examiner* — Thien S Tran
(74) *Attorney, Agent, or Firm* — Howard & Howard Attorneys PLLC

(57) ABSTRACT

Simultaneous laser welding equipment of a vehicle light including at least a plurality of laser sources suitable for emitting light beams, a plurality of optical fibres associated, at the input ends to the at least one laser source and transmitting the light beams. A light guide is provided with at least one hollow seat that delimits a continuous perimetral contour, counter-shaped to the weld interface. The light guide comprises diffusion elements that pass through the perimetral contour of the seat of the light guide internally, so as to intercept and influence the light beams that propagate inside the seat and that are shaped to expand the light beams along a direction substantially tangent to the curvilinear abscissa defining the perimetral contour, before it projects from the light output wall and/or at the latter.

27 Claims, 11 Drawing Sheets

(51) Int. Cl.
*B23K 26/06* (2014.01)
*B23K 26/12* (2014.01)
*B23K 37/04* (2006.01)
*G02B 6/42* (2006.01)
*F21V 17/10* (2006.01)
*B29L 31/00* (2006.01)
*B23K 101/00* (2006.01)

(52) U.S. Cl.
CPC ...... *B23K 37/0426* (2013.01); *B29C 65/1635* (2013.01); *B29C 65/1667* (2013.01); *B29C 65/1687* (2013.01); *B29C 66/114* (2013.01); *B29C 66/131* (2013.01); *B29C 66/542* (2013.01); *F21S 41/29* (2018.01); *F21S 43/27* (2018.01); *G02B 6/4202* (2013.01); *B23K 2101/006* (2018.08); *B29C 65/167* (2013.01); *B29C 65/1664* (2013.01); *B29C 66/301* (2013.01); *B29C 66/3472* (2013.01); *B29C 66/71* (2013.01); *B29C 66/8122* (2013.01); *B29L 2031/747* (2013.01); *F21V 17/101* (2013.01)

(58) Field of Classification Search
USPC .................................................. 219/121.64
See application file for complete search history.

(56) References Cited

U.S. PATENT DOCUMENTS

| | | | | |
|---|---|---|---|---|
| 8,134,099 | B2* | 3/2012 | Nakano | B23K 26/046 219/121.69 |
| 9,874,329 | B2* | 1/2018 | Boero | B29C 65/169 |
| 10,065,363 | B2* | 9/2018 | Schiccheri | B29C 65/16 |
| 10,403,499 | B2* | 9/2019 | Aslanov | H01L 21/02595 |
| 10,451,243 | B2* | 10/2019 | Gloss | F21S 43/235 |
| 2003/0016908 | A1* | 1/2003 | Okada | G02B 6/352 385/31 |
| 2005/0169153 | A1* | 8/2005 | Ogasawara | G11B 7/1353 369/112.16 |
| 2008/0158499 | A1* | 7/2008 | Lai | G02F 1/133711 349/162 |
| 2015/0276159 | A1* | 10/2015 | Boero | B29C 66/114 362/511 |
| 2016/0236403 | A1* | 8/2016 | Schiccheri | F21S 43/19 |
| 2017/0014948 | A1 | 1/2017 | Guo et al. | |
| 2017/0167688 | A1* | 6/2017 | Gloss | G02B 27/1093 |
| 2019/0039175 | A1* | 2/2019 | Schnick | B23K 26/0604 |

FOREIGN PATENT DOCUMENTS

| | | | | |
|---|---|---|---|---|
| EP | 2923820 | A1 | 9/2015 | |
| EP | 2949452 | A1 | 12/2015 | |
| EP | 2957418 | A1 | 12/2015 | |
| JP | 2001243811 | A | 9/2001 | |
| JP | 4396476 | B2 | 1/2010 | |
| JP | 2016083799 | A * | 5/2016 | ........... B29C 66/301 |
| WO | 2016063720 | A1 | 4/2016 | |

OTHER PUBLICATIONS

Search Report for Chinese Patent Application No. 201811191035.2 dated May 27, 2021.

* cited by examiner

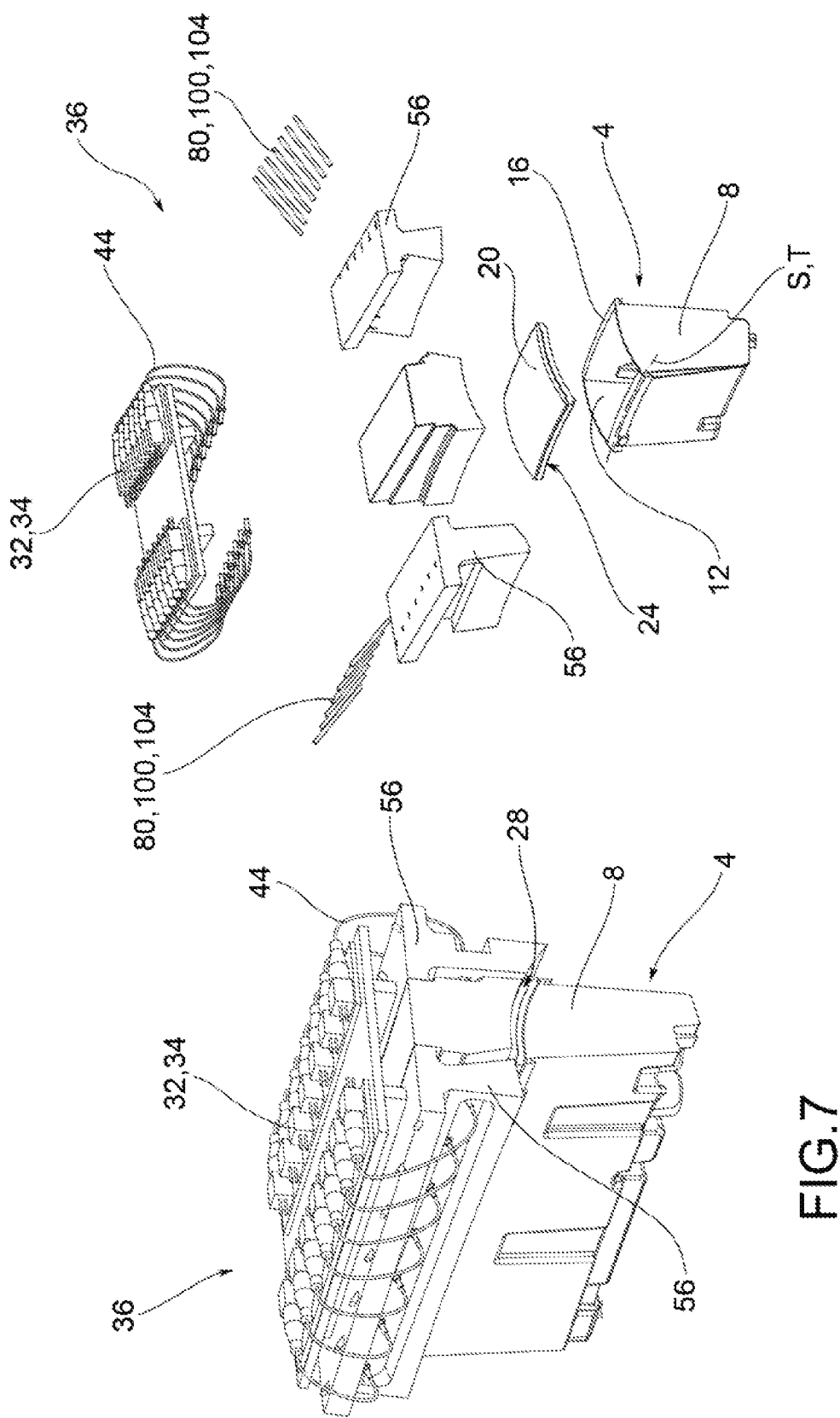

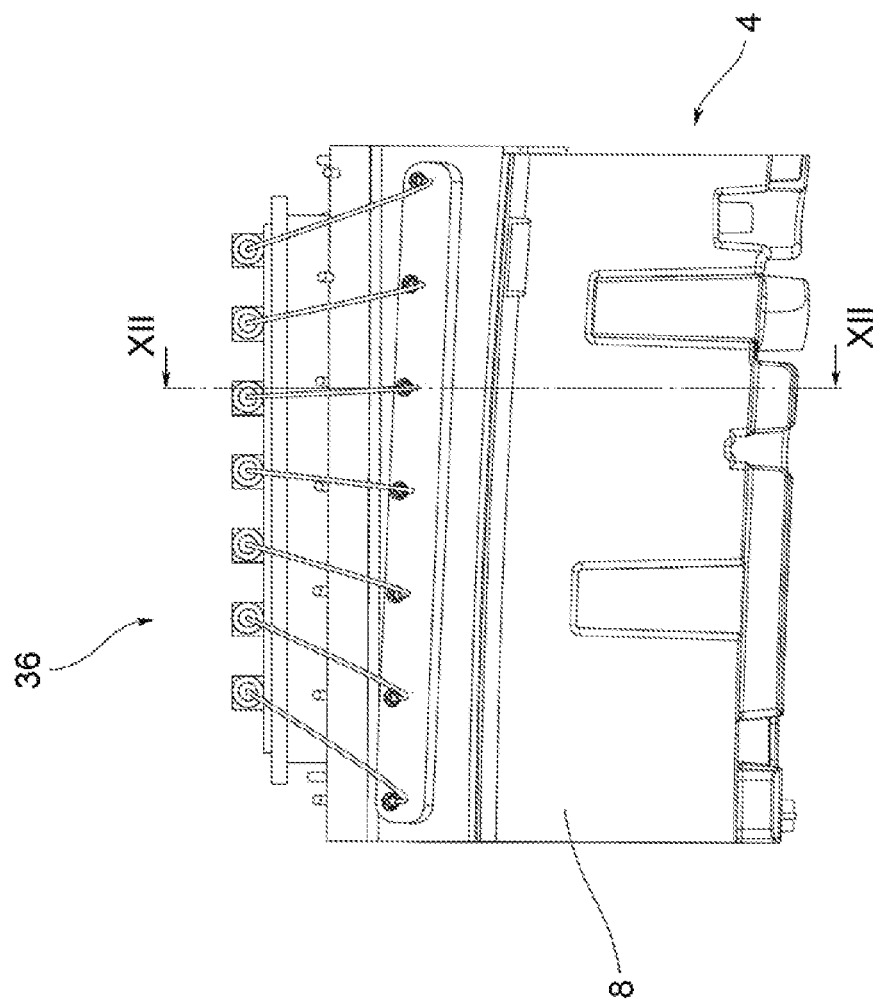

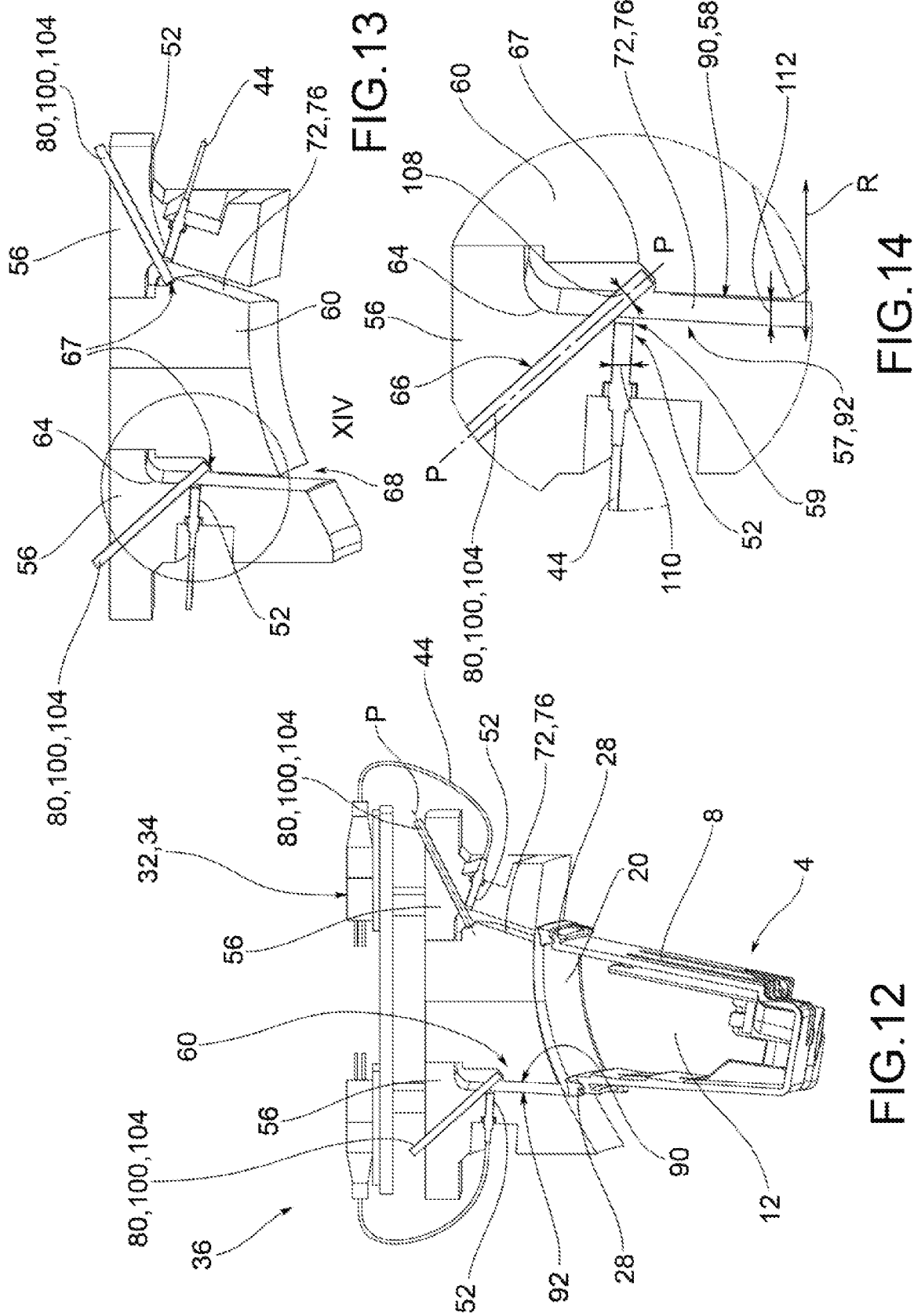

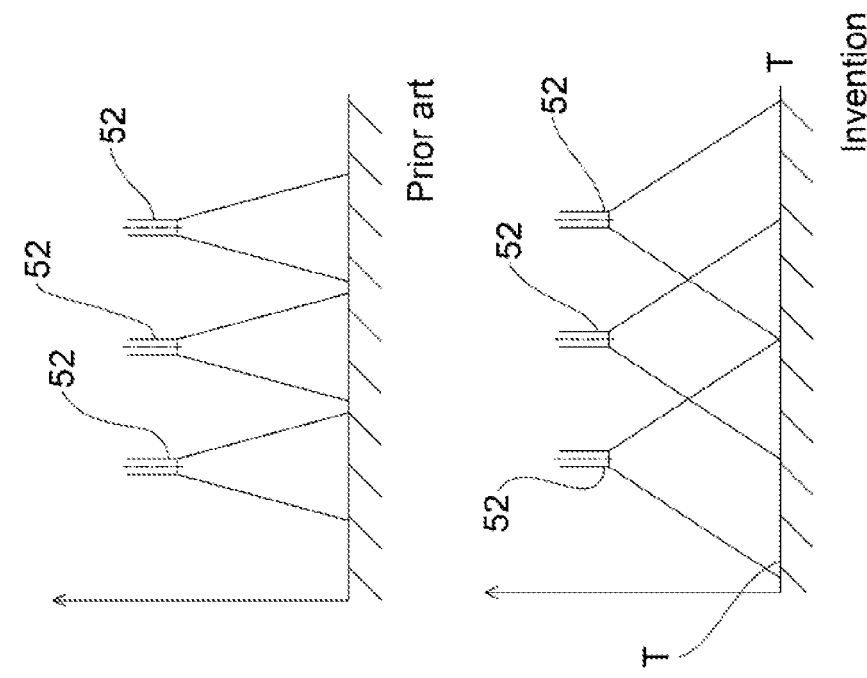
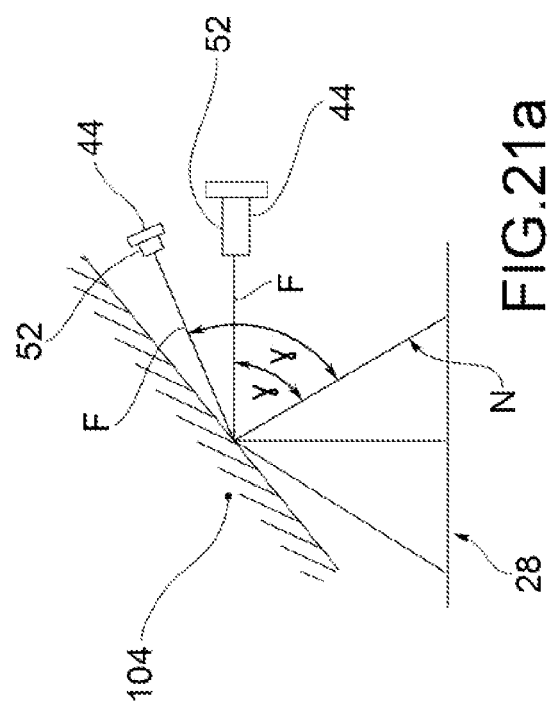
FIG.21a
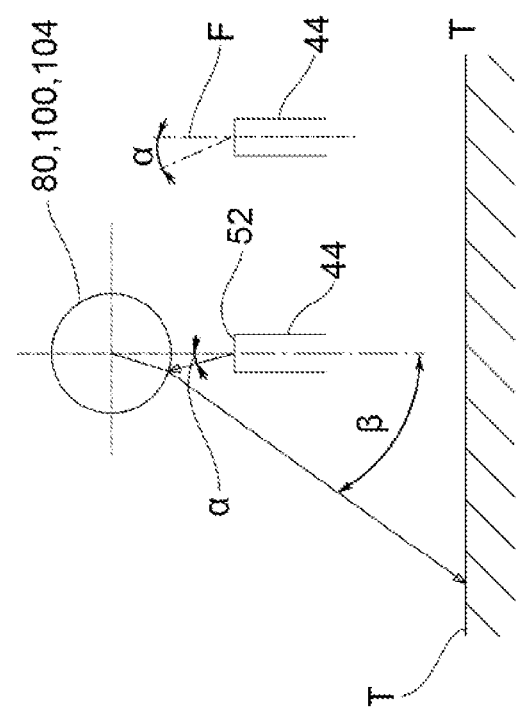
FIG.21b
FIG.22

SIMULTANEOUS LASER WELDING EQUIPMENT OF A VEHICLE LIGHT

CROSS-REFERENCE TO RELATED APPLICATIONS

The present application claims priority to and all the benefits of Italian Patent Application No. 102017000114962, filed on Oct. 12, 2017, which is hereby expressly incorporated herein by reference in its entirety.

BACKGROUND OF THE INVENTION

1. Field of the Invention

The present invention relates to simultaneous laser welding equipment of a vehicle light and a simultaneous laser welding method of a vehicle light.

2. Description of the Related Art

The term automotive light is understood to mean indifferently a rear automotive light or a front automotive light, the latter also known as a headlight.

As is known, a vehicle light is a lighting and/or signalling device of a vehicle comprising at least one external light of the vehicle having a lighting and/or signalling function toward the outside of a vehicle such as, for example, a position light, a direction indicator light, a brake light, a rear fog light, a reversing light, a low beam headlight, a high beam headlight, and the like.

The automotive light, in its simplest form comprises a container body, a lenticular body and at least one light source.

The lenticular body is placed so as to close a mouth of the container body so as to form a housing chamber. The light source is arranged inside the housing chamber, which may be directed so as to emit light towards the lenticular body, when powered with electricity.

The method of manufacture of an automotive light, once assembled the various components, must provide for the attachment and hermetic sealing of the lenticular body to the container body.

Such sealing and attachment is usually performed by laser welding.

The laser welding techniques of the prior solutions are not however free from drawbacks, since the laser welding processes of the lenticular bodies to the container body are rather complex, slow and therefore expensive.

It is known to perform simultaneous laser welding in which, initially, the respective edges or perimeter profiles of the lenticular body and the container body which are counter-shaped so as to interface, are placed in mutual contact in the assembly configuration of the vehicle light, at a weld interface. Simultaneous welding is then carried out simultaneously on the entire weld interface.

During the welding step, the container body acts as an absorbing member in relation to the light beam emitted by the laser source while the lenticular body acts as a transmissive member of the light beam.

The lenticular body substantially transmits, without absorbing it, the laser beam incident thereon which reaches the weld interface. At this point, the laser beam is absorbed by the perimeter edge of the container body which warms up to softening point.

The softening, accompanied by a reciprocal pressure of approach between the bodies, determines the partial interpenetration between the profiles and therefore the realization of a weld bead on said weld interface.

As may be imagined, for the quality and strength of the weld bead the incident energy on the entire interface must be evenly measured.

In this regard, simultaneous laser welding techniques are known in which a laser source, for example a laser diode is connected to a bundle of optical fibres which have the function of spreading the laser beam generated and directing it towards a plurality of points on the weld interface.

The optical fibres end in a light guide that distributes the light beams on the weld interface.

This solution is not without disadvantages.

In fact, the light guide is not able to distribute the energy of the light beams uniformly throughout the weld interface, completely nullifying the effect of the discrete distribution of the optical fibres. In fact, despite the presence of the light guide, peaks of energy interspersed with minimum energy are always observable and such a non-optimal wave distribution of energy has negative repercussions on the quality of the weld.

SUMMARY OF THE INVENTION

The object of the present invention is therefore to perform the welding of vehicle lights using equipment and a related simultaneous laser welding method that can overcome the technical drawbacks related to the solutions of the prior art.

This purpose is achieved by simultaneous laser welding equipment for a vehicle light including a placement support for supporting a container body and a lenticular body of a vehicle light to be welded together at reciprocal perimeter profiles associated at a weld interface, at least one laser source suitable for emitting light beams, and a plurality of optical fibres, each extending from an input end to an output end. The optical fibres are associated, at the input ends to the at least one laser source and are suitable to transmit the light beams. A light guide provided with at least one hollow seat having at least one light input wall receives the light beams coming from the output ends of the optical fibres. A light output wall sends the light beams towards the weld interface. The seat of the light guide delimits a continuous perimetral contour, counter-shaped to said weld interface, wherein the light guide includes diffusion elements that pass through said perimetral contour of the seat of the light guide internally, so as to intercept and influence the light beams that propagate inside said seat. The diffusion elements are shaped to expand the light beams along a direction substantially tangent to the curvilinear abscissa defining the perimetral contour, before it projects from the light output wall and/or at the latter. In addition, the present invention is also directed toward a method of simultaneous laser welding of a vehicle light.

BRIEF DESCRIPTION OF THE DRAWINGS

Other advantages of the invention will be readily appreciated as the same becomes better understood by reference to the following detailed description when considered in connection with the accompanying drawings, wherein:

FIG. 7 is a perspective view of welding equipment of a vehicle light according to one embodiment of the present invention; in an assembled configuration;

FIG. 8 is a perspective view in separate parts of the welding equipment of a vehicle light in FIG. 8;

FIG. 10 is a side view of the equipment in FIG. 8;

FIG. 11 is another side view of the equipment of FIG. 8;

FIG. 12 is a perspective cross-section view of the equipment in FIG. 8, along the cross-section plane XII-XII indicated in FIG. 11;

FIG. 13 is a partial enlargement of FIG. 12;

FIG. 14 is the enlarged detail XIV in FIG. 13;

FIG. 21a is a schematic view of the operation of the equipment according to the invention;

FIG. 21b is another schematic view of the operation of the equipment according to the invention; and FIG. 22 is a schematic view of the operation of the equipment according to the invention compared to a solution of the prior art.

The elements or parts of elements common to the embodiments described below will be indicated using the same reference numerals.

DETAILED DESCRIPTION OF THE INVENTION

Figure 2:
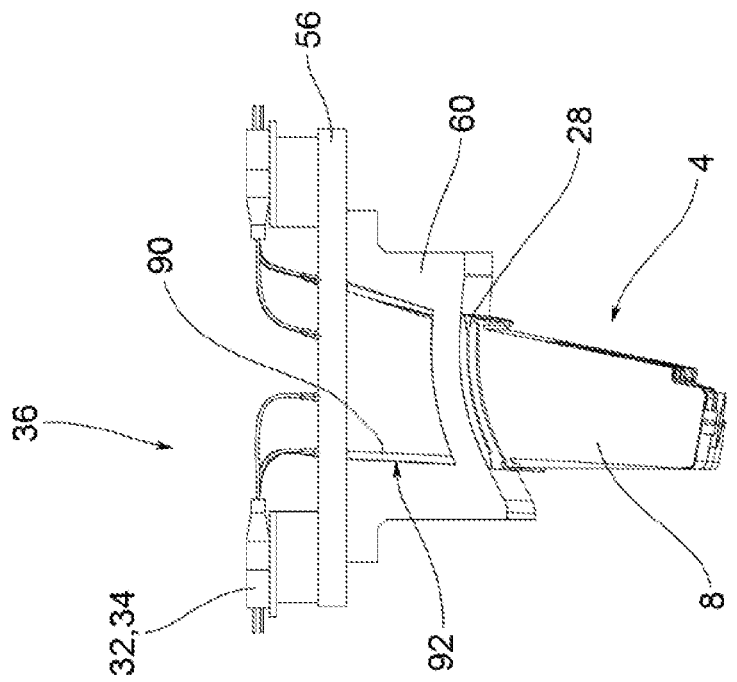
FIG. 2 is a side view of the equipment in FIG. 1.
Figure 1:
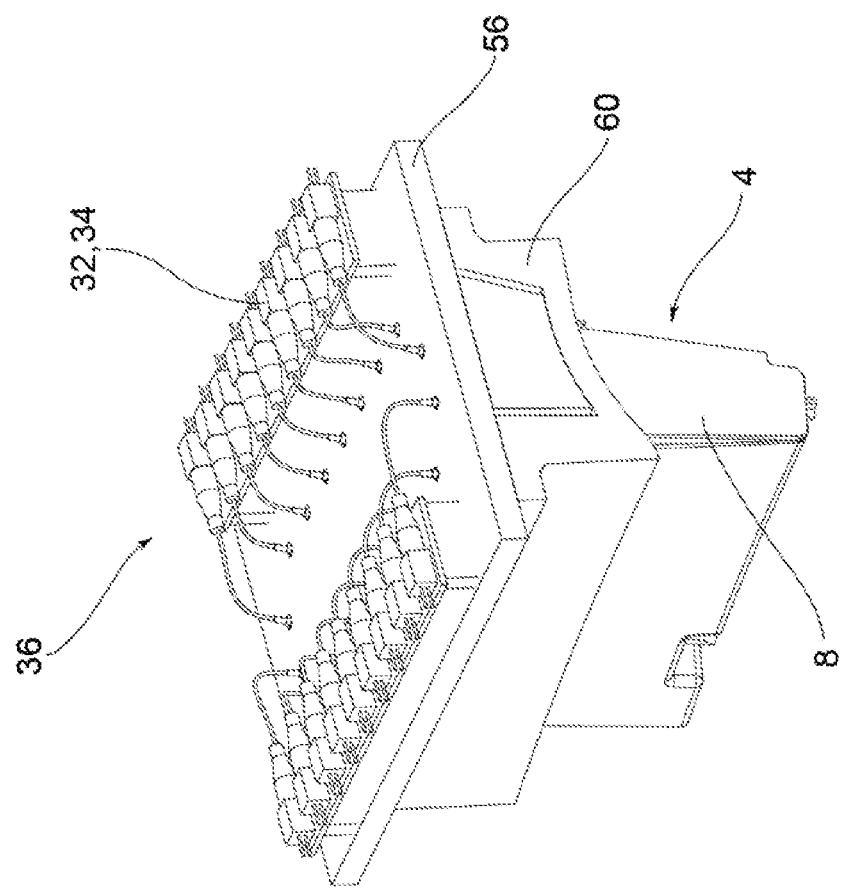
FIG. 1 is a perspective view of welding equipment of a vehicle light according to one embodiment of the present invention, in an assembled configuration.
Figure 4:
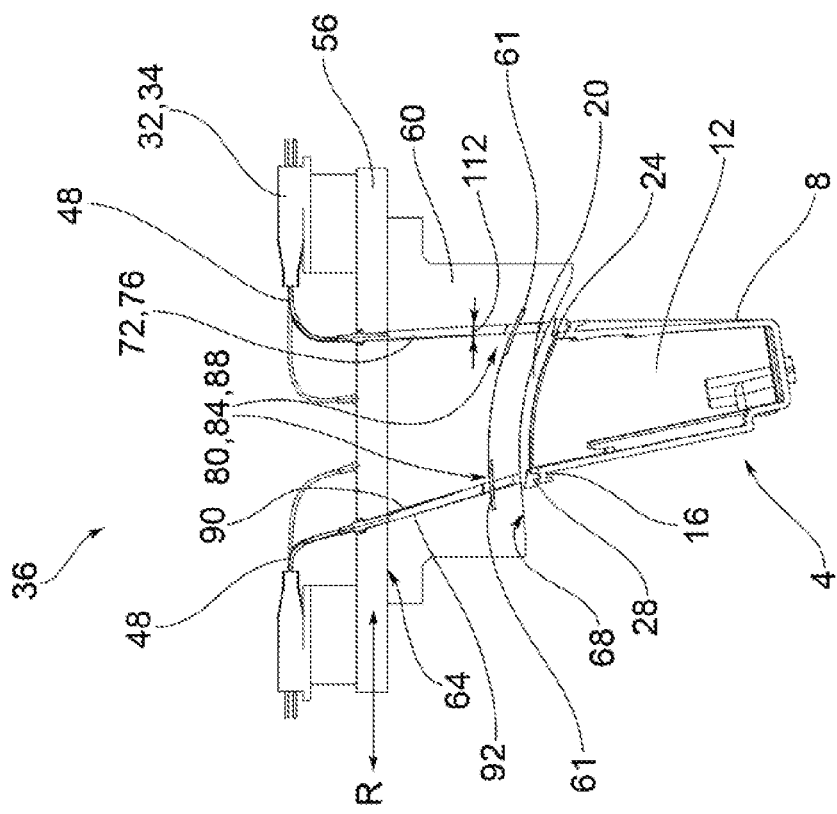
FIG. 4 is a cross-section view of the equipment in FIG. 1, along the cross-section plane Iv-Iv indicated in FIG. 3.
Figure 3:
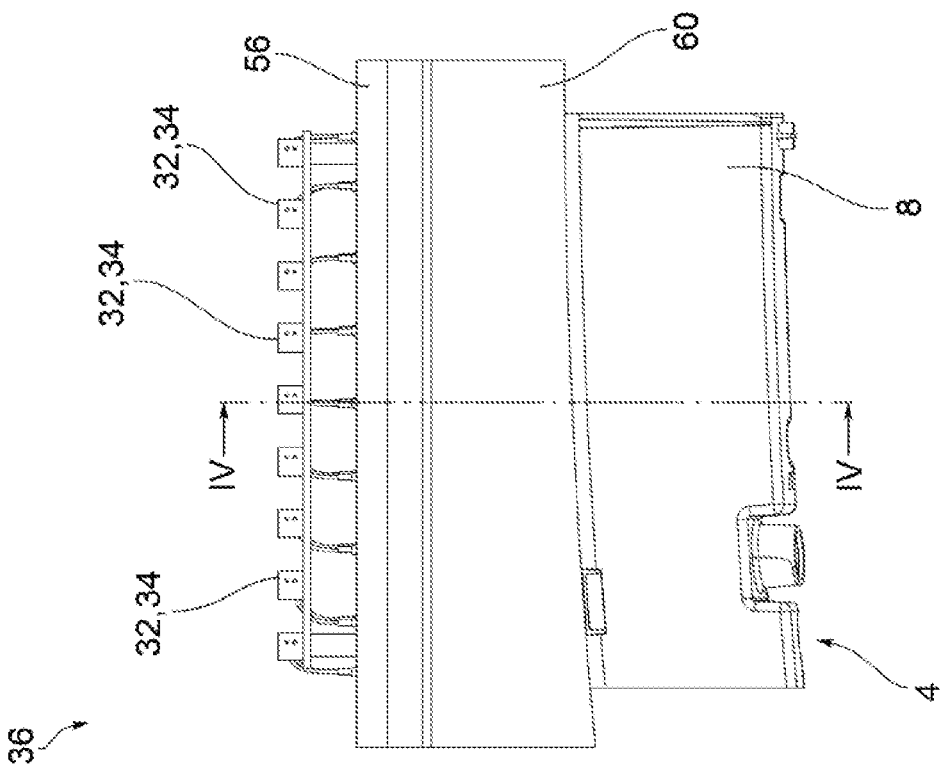
FIG. 3 is a further side view of the equipment in FIG. 1.
Figure 5:
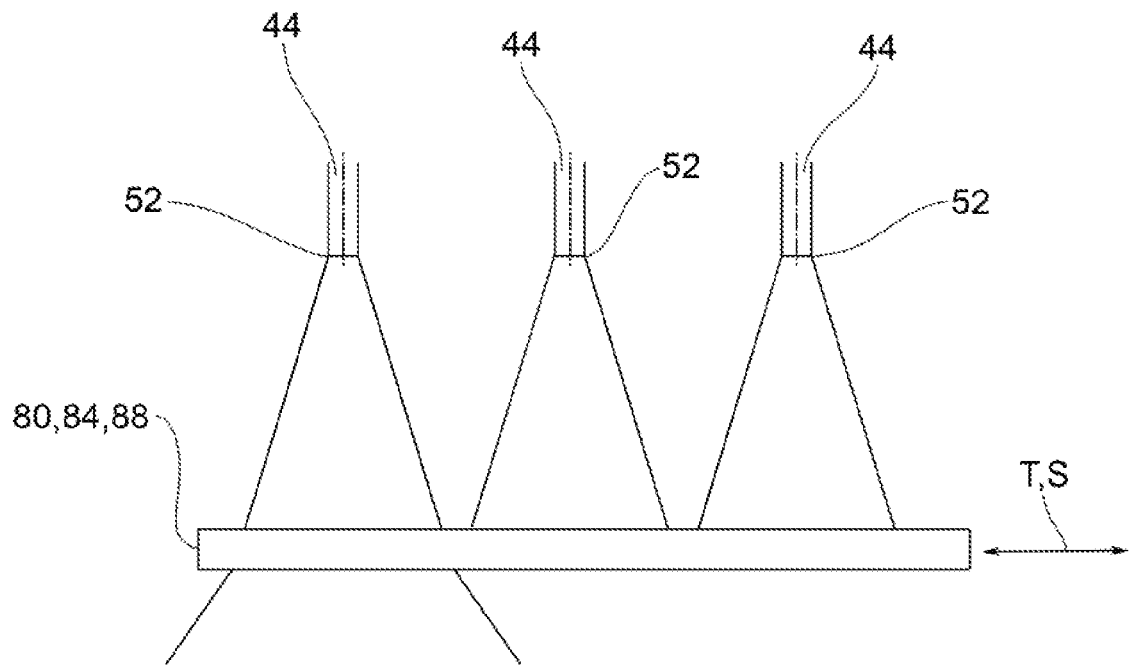
FIG. 5 is a schematic view of the technical diffusion effect of the light beam in one embodiment of the present invention.

With reference to the aforementioned figures, reference numeral 4 globally denotes an automotive light, which the description which follows refers to without by so doing losing its general application.

As mentioned above, the term vehicle light is understood to mean indifferently a rear vehicle light or a front vehicle light, the latter also known as a headlight.

As is known, the vehicle light comprises at least one light outside of the vehicle having a lighting and/or signalling function, as for example a position light, which may be a front, back, side position light, a direction indicator light, a brake light, a rear fog light, a reversing light, a low beam headlight, a high beam headlight, and the like.

The automotive light 4 comprises a container body 8, usually of polymeric material, which typically permits the attachment of the automotive light 4 to the relative vehicle.

For the purposes of the present invention, the container body 8 may be any shape, size and assume any position: for example, the container body may not be directly joined to the body or other fixtures of the associable vehicle.

According to one embodiment, the container body 8 delimits a containment housing 12 which houses at least one light source (not shown) electrically connected to source of electric power for supplying power to the same, and adapted to emit a light beam to propagate outside the automotive light. For the purposes of the present invention the type of light sources used is irrelevant; for example, the light source is a light source of light emitting diodes (LED).

The container body 8 is delimited by a first perimetral profile 16.

A lenticular body 20 is, in turn, delimited by a second perimetral profile 24 that is joined to the container body 8.

The lenticular body 20 is applied to the container body 8 so as to close the containment housing 12 having at least one light source.

For the purposes of the present invention, the lenticular body 20 may be external to the vehicle light 4, so as to define at least one outer wall of the vehicle light directly subject to the atmosphere.

The lenticular body 20 closes the containment housing 12 and is suitable to be crossed by the beam of light produced by the light source which is transmitted to the outside of the containment housing 12.

To such purpose, the lenticular body 20 is made of at least partially transparent or semi-transparent or translucent material, and may also comprise one or more opaque portions, so as to allow in any case the at least partial crossing of the light beam produced by the light source.

According to possible embodiments, the material of the lenticular body 20 may include a resin such as PMMA, PC and the like.

The first and second perimetral profile 16, 24 of the container body 8 and of the lenticular body 20 are at least partially counter-shaped to each other so as to interface, in an assembled configuration of the vehicle light 4, at a weld interface 28.

As better explained below, following the laser welding at the weld interface 28, the welding bead is formed and the partial interpenetration between the perimeter profiles 16, 24 is realized.

The assembly of the automotive light 4 comprises the step of joining at least partially to each other the respective first and second perimetral profiles 16, 24. For example, the step is provided for arranging the lenticular body 20 to close the containment housing 12 of the container body 8 so as to join the respective first and second perimetral profiles 16, 24.

The production method of the vehicle light provides for joining to each other the lenticular body 20 and the container body 8, at said perimetral profiles 16, 24, by simultaneous laser welding.

The welding of the lenticular body 20 to the container body 8 is a simultaneous laser welding, wherein the light beam emitted by at least one laser source 32 is routed towards the perimetral profiles 16, 24 so as to reach the first perimetral profile 16 of the container body 8 after passing through the lenticular body 20.

During the simultaneous laser welding step, the container body 8 acts as an absorbing member in relation to the light beam emitted by the laser source 32 and the lenticular body 20 acts as a transmissive member of said light beam.

Welding takes place by using special simultaneous laser welding equipment 36, particularly suitable for welding a vehicle light 4 in which the simultaneous welding of the lenticular body 20 and the container body 8 is provided for.

Such simultaneous laser welding equipment 36 of a vehicle light 4 according to the present invention comprises a placement support for supporting the container body 8 and the lenticular body 20 of the vehicle light 4 to be welded together at the respective first and second perimeter profiles 16, 24 joined at the weld interface 28. Without detracting from its general application, the equipment 36 may be that described in the Italian patent application 102017000041997 on behalf of the same applicant.

The equipment 36 thus comprises a plurality of laser sources 32, preferably a plurality of laser diodes 34, suitable to emit light beams.

According to possible further embodiments, the laser source 32 is not limited to a laser diode but may comprise a $CO_2$ laser source, wherein the laser beam is produced by a mixture of gases comprising $CO_2$, or a YAG laser, in which the laser beam is produced by a solid-state crystal, or further types of laser sources.

The welding equipment 36 further comprises a plurality of optical fibres 44 each extending from an input end 48 to an output end 52. In particular, the optical fibres 44 are associated with the laser sources 34 at said input end 48, through which the light beam is channelled inside the fibre 44 and internally transmitted by subsequent reflections until it comes out through the output end 52.

According to a possible embodiment, a single optical fibre 44 is associated at its input end 48 to each laser source 34, 44 so as to receive, channel and transmit towards the weld interface 28, the light beam produced by said corresponding laser source 32, 34.

In other words, each optical fibre 44 is associated at its input end 48 to a single respective laser source 32, 34 so as to receive, channel and transmit towards the weld interface 28, the light beam produced by said corresponding laser source 32, 34.

Thus, only one corresponding optical fibre 44 may be associated with each light source 32, 34.

Of course, in a different embodiment, the simultaneous laser welding equipment 36 may comprise at least one laser source 32 associated with a bundle of optical fibres 44 which then branch along the weld interface 28.

Optical fibres 44, in a known manner, transmit by total internal reflection the light beams introduced through their input ends 48 to their output ends 52.

In one embodiment, the output ends 52 of the optical fibres 44 are spaced apart by a pitch of between 10 and 40 mm.

The equipment 36 comprises a fibre-holder support 56 for supporting the output ends 52 of the optical fibres 44, suitable for locking at predetermined positions the output ends 52 of said optical fibres 44, to arrange the latter so as to appropriately radiate the entire weld interface 28, as described in greater detail below.

Furthermore, the equipment 36 comprises a light guide 60 associated with the fibre-holder support 56.

In addition, the light guide 60 is shaped to receive, at a light input wall 64, the light beams coming out of the output ends 52 of the optical fibres 44 and to convey them through a light output wall 68 thereof to the weld interface 28.

The light guide 60 is provided with at least one hollow seat 72 extending between the light input wall 64 and the light output wall 68.

The light guide 60 is connected in cascade to the fibre-holder support 56, wherein each output end 52 of each optical fibre 44 blocked in the fibre-holder support 56 is placed adjacent to the light input wall 64 of the light guide 60 so as to be overlooking the hollow seat 72 of the light guide 60.

Preferably the seat 72 of the light guide 60 delimits a continuous perimetral contour 76, counter-shaped to said weld interface 28.

The seat 72 of the light guide 60 is delimited by side walls 90, 92 preferably flat and parallel to each other with respect to a cross-section plane perpendicular to a curved abscissa S-S defining said perimetral contour 76.

According to a further embodiment, the seat 72 of the light guide 60 is delimited by side walls 90, 92 which are flat and divergent from each other at the output end 52 of each optical fibre 44 with respect to a cross-section plane perpendicular to a curved abscissa S-S defining said perimetral contour 76. In other words, the side walls 90, 92 may diverge by moving from the laser sources 32 to the weld interface 28.

Therefore, the perimetral contour 76 is a closed contour, which may extend along a closed polyline, which follows the profile of the weld interface 28.

The closed contour may comprise curved segments, or may comprise a combination of straight and/or curved segments connected together seamlessly to form a closed profile.

Advantageously, the light guide 60 includes diffusion elements 80 that pass through the perimetral contour 76 of the seat 72 of the light guide 60 internally, so as to intercept and influence the light beams that propagate inside said seat 72.

The diffusion elements 80 are shaped to expand the light beams along a direction substantially tangent to a curvilinear abscissa S defining the perimetral contour 76, before it comes out of the light output wall 68 and/or at the latter.

In other words, the diffusion elements 80 can be arranged both inside the light guide 60 and at its light input wall 64 or its light output wall 68.

According to a possible embodiment, (FIGS. 1-6, 15-21), the diffusion elements 80 include refractive diffusion portions 84, made of a material having a different refractive index with respect to a filler medium that fills the perimetral contour 76 of the seat 72 and suitable to be crossed by the light beams incident on it.

Typically, the filling medium comprises air and therefore the light guide 60 is a so-called negative light guide.

It is also possible to provide that said filler medium comprises, for example, a polymeric material such as PMMA, which is obviously transparent to the light beam. In this case a positive light guide is spoken of.

In addition, the light guide 60 may also be partially hollow and partially filled with a filler medium.

According to one embodiment, said refractive diffusion portions 84 include a film 88 of polymer material transparent to the light beam and having a different refraction index to the refraction index of the filler medium of the perimetral contour 76 of the seat 72.

According to a possible embodiment, (FIG. 6), said film 88 comprises a plurality of optics 96 that expand the light beams incident thereon.

More specifically, the light guide 60 has a pocket 61 extending inside the light guide 60 in order to trace the perimeter of the weld interface 28. The film 88 is placed inside said pocket 61 so to cross the entire hollow seat 72 of the light guide 60. In fact, the hollow seat 72 is entirely interrupted by the film 88, so that a ray of the light beam propagated inside the hollow seat 72 of the light guide 60 is influenced by said film 88. In a preferred embodiment, the film 88 is anisotropic, i.e., provided with micro-optics 96 oriented so as to expand the light beams in a direction T substantially tangent to said curvilinear abscissa S along the entire perimetral contour 76.

An anisotropic film is in fact more efficient for the purpose than an isotropic one. However, since the geometry of the weld interface 28 is complex, it is necessary to break the anisotropic film 88 into segments so that the micro-optics 96 are always oriented so as to longitudinally expand the light beams along the perimetral contour 76 and not transversely. In other words, the direction of diffusion of the film 88 must always be tangent to the weld interface 28. The segments of the film 88 are then laid inside the pocket 61 seamlessly along the perimetral contour 76 until it is entirely traced. Preferably the film 88 is located at a distance greater than 3 cm from the outlet end 52 of the optical fibres 44, for the laser powers normally used in headlights. Advantageously, the film 88 constitutes a barrier for unwanted dirt fragments, which may accumulate over time to the detriment of the functioning of the simultaneous laser welding equipment 36.

Figure 6:
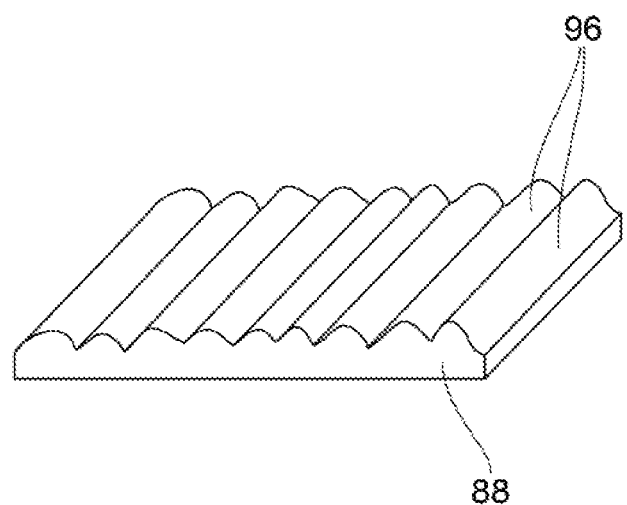
FIG. 6 is a perspective view of a component of the equipment in FIG. 1.

The diffusion effect obtained on the light beam is schematically illustrated in FIG. 6 in which the opening that the light beam undergoes is evidenced, in said tangent direction T-T to the main extension direction S-S of the perimetral contour 76, after having crossed the refractive diffusion elements 80, including the refractive diffusion portions 84 such as the film 88.

According to a possible embodiment, with particular reference to FIGS. 7-22, the diffusion elements 80 comprise reflexive diffusion portions 100 that reflect and expand the light beams incident thereon.

For example, the reflexive diffusion portions 100 comprise at least one pin 104 placed facing the output end 52 of each corresponding optical fibre 44.

The pin 104 is positioned so that the output end 52 is interposed between the pin 104 and the weld interface 28 so as to reflect towards the weld interface 28 the light beam incident on it.

According to one embodiment, the pin 104 is oriented so that a perpendicular N to the pin identifies, with an optical axis F of the corresponding optical fibre, an angle of incidence $\gamma$ of between 25 and 65 degrees. The term optical axis is used to reference a main axis of propagation and symmetry of the light beam emitted by the laser source 32.

Figure 9:
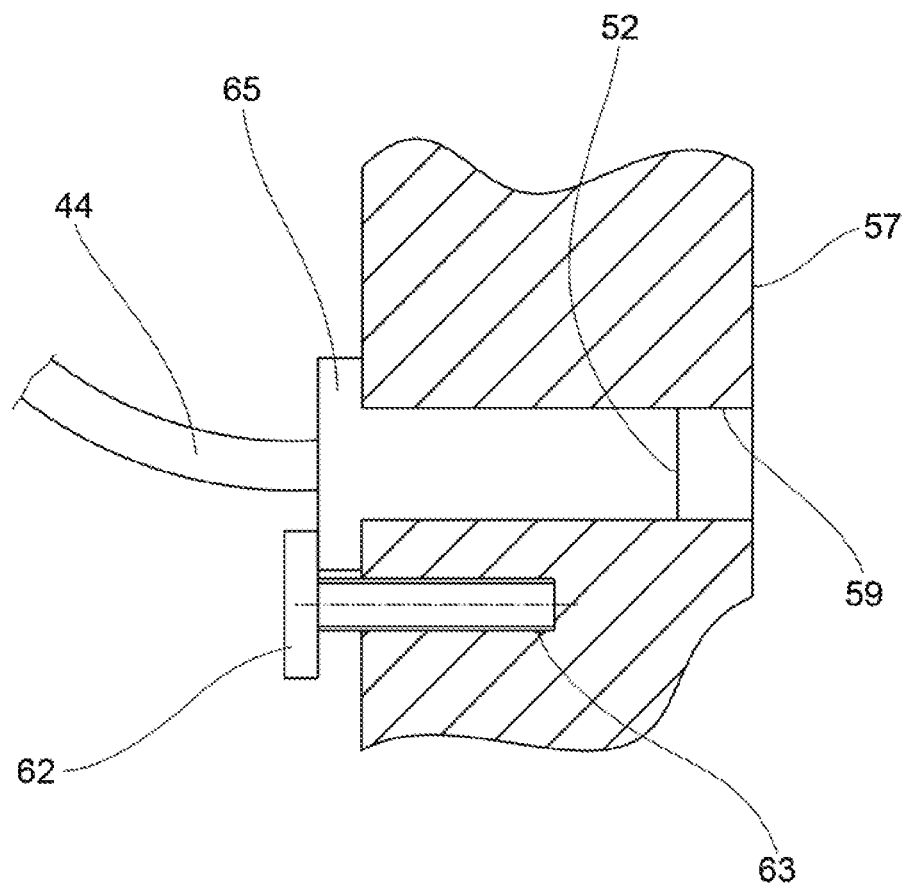
FIG. 9 is a cross-section view of an assembly detail of an optic fibre of the light in FIG. 7.
Figure 16:
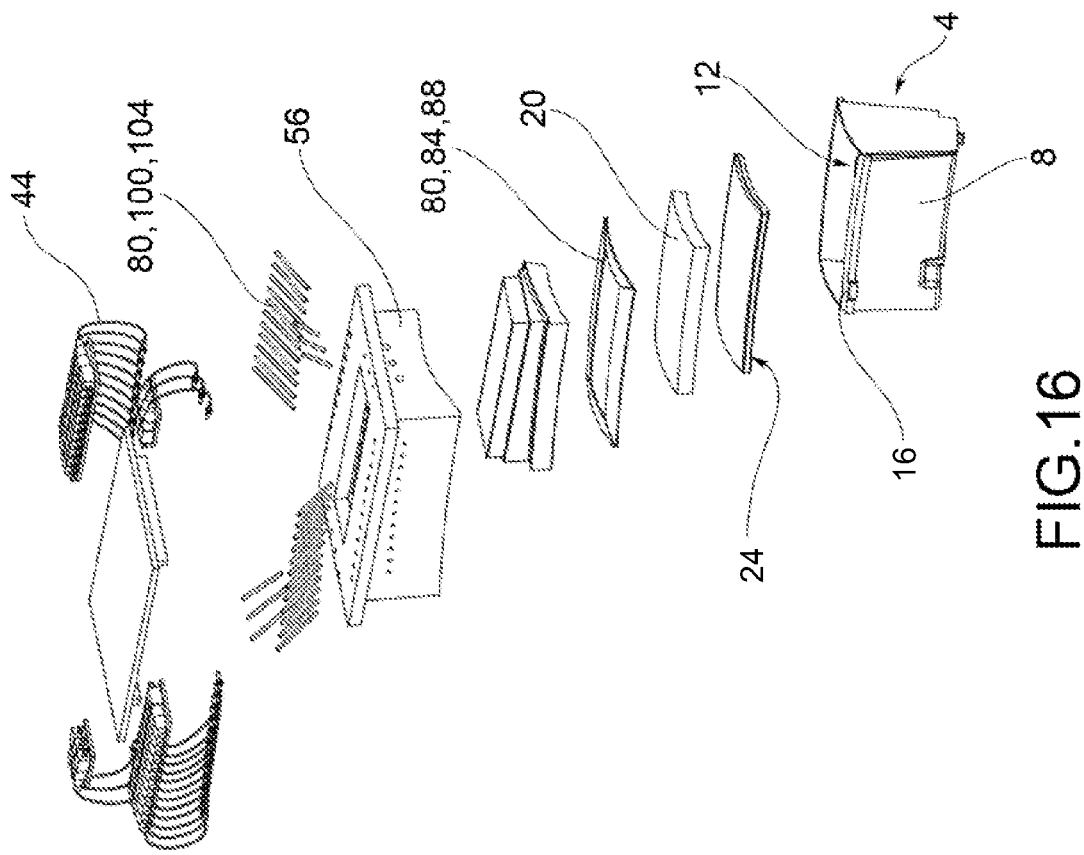
FIG. 16 is a perspective view in separate parts of the welding equipment of a vehicle light in FIG. 15.
Figure 15:
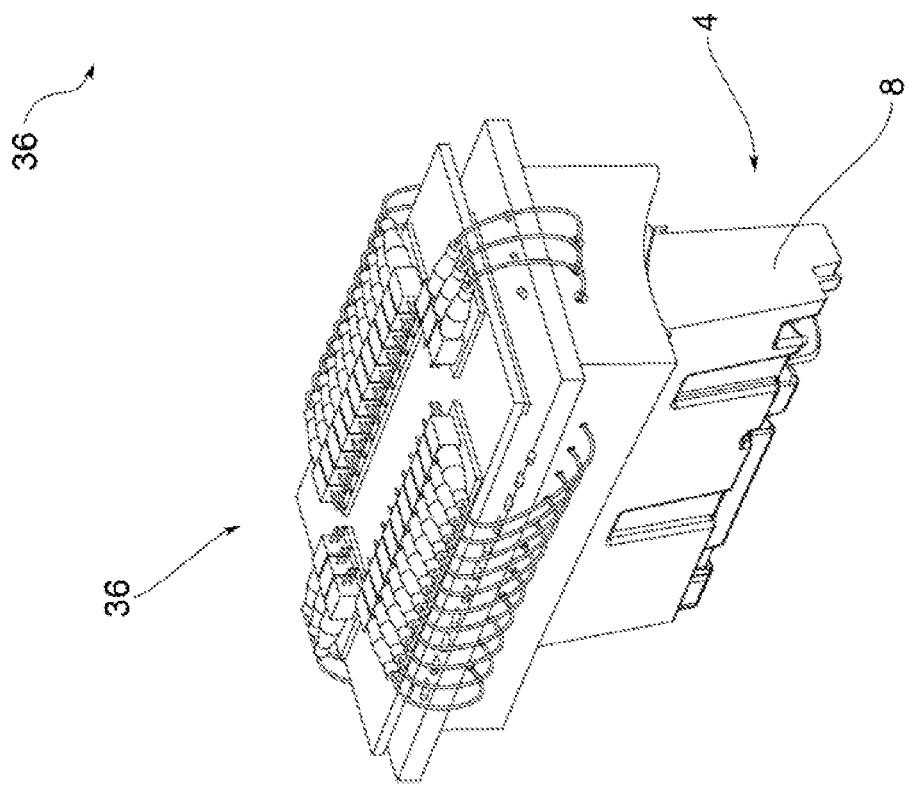
FIG. 15 is a perspective view of welding equipment of a vehicle light according to one embodiment of the present invention in an assembled configuration.
Figure 17:
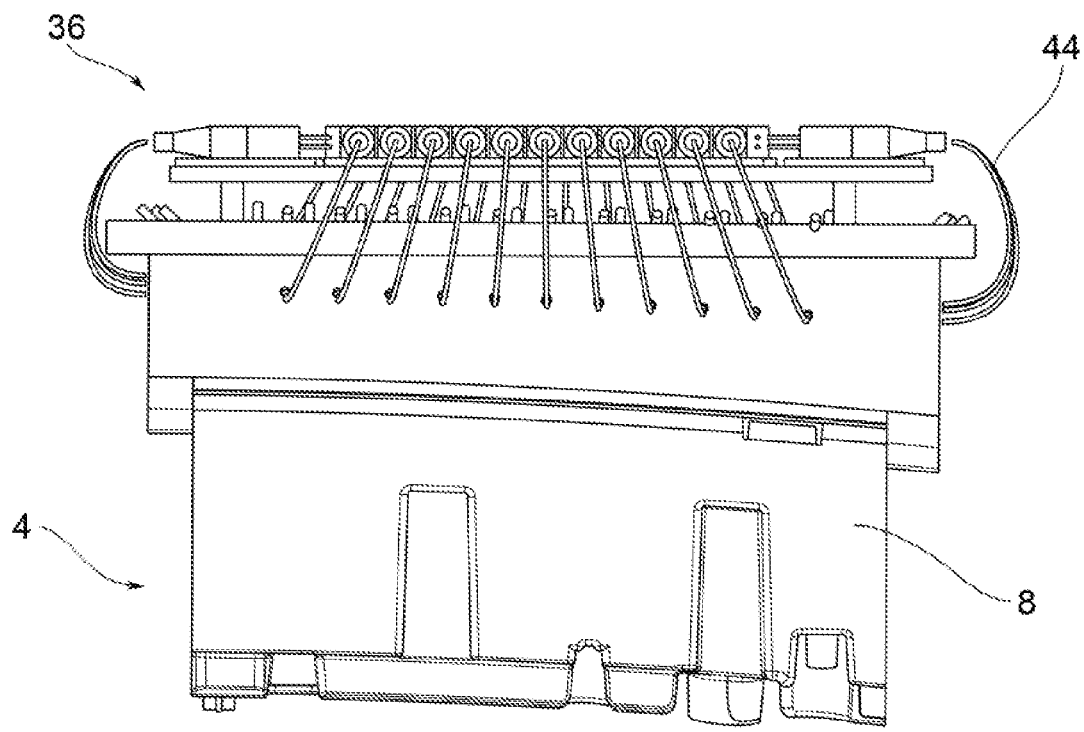
FIG. 17 is a side view of the equipment in FIG. 15.
Figure 18:
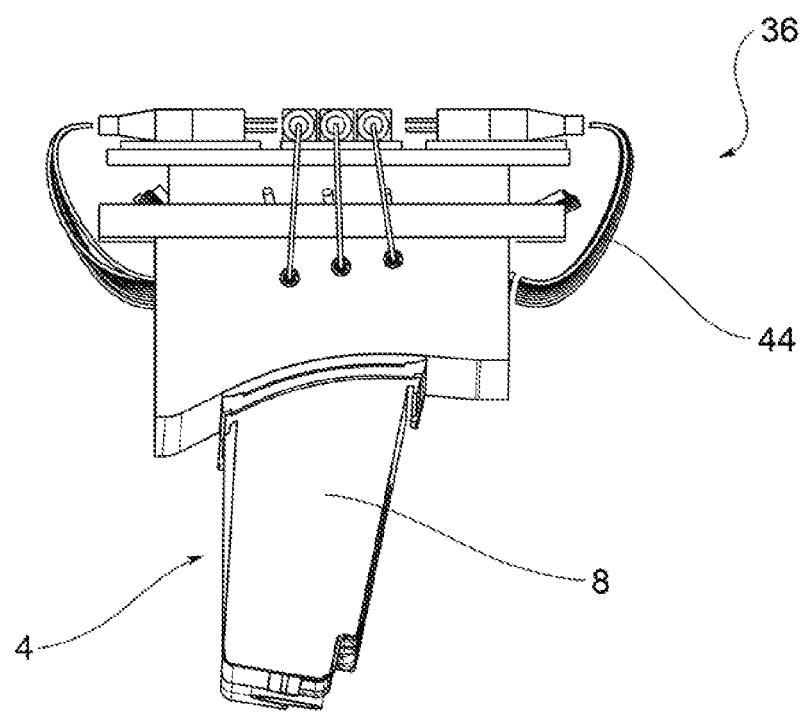
FIG. 18 is another side view of the equipment in FIG. 15.
Figure 19:
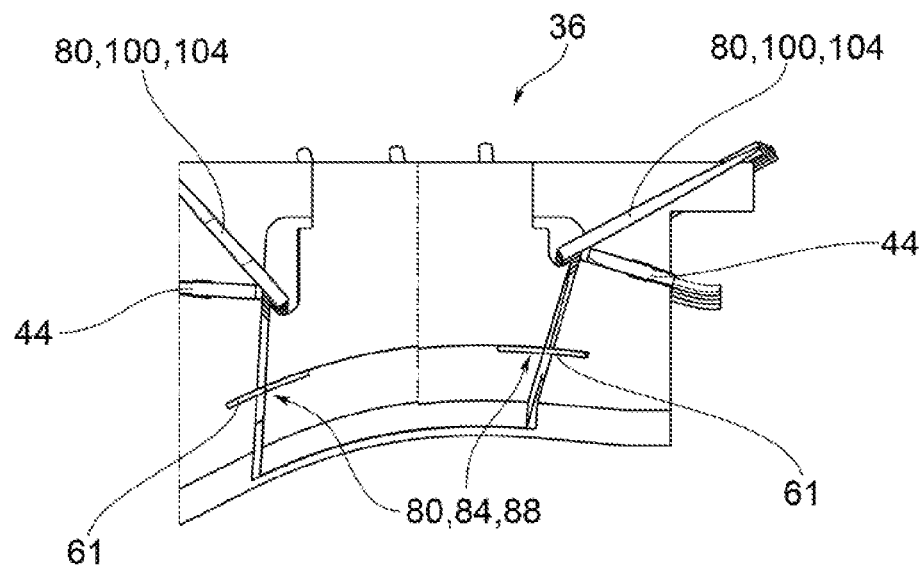
FIG. 19 is a cross-section view of the equipment in FIG. 15.
Figure 20:
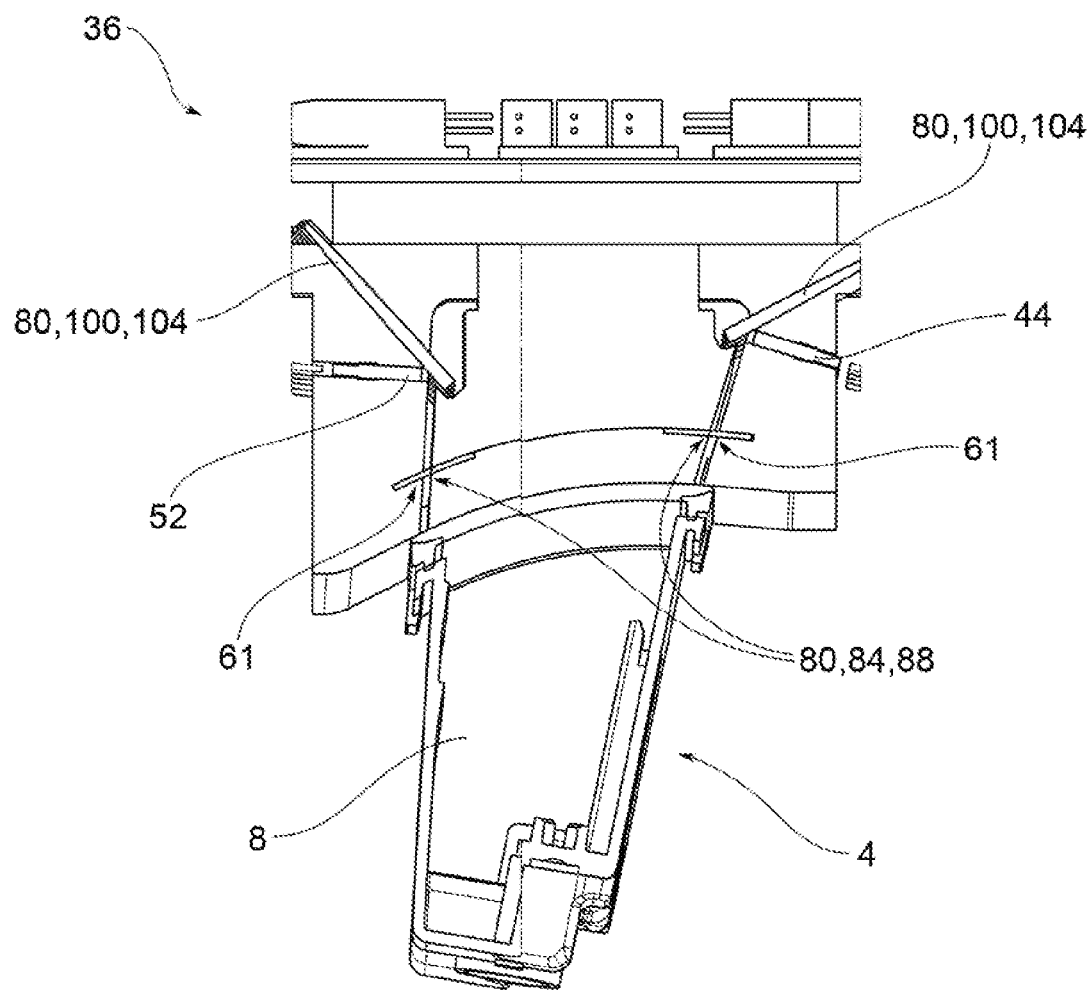
FIG. 20 is another cross-section view of the equipment in FIG. 15.

More specifically, in an embodiment illustrated in FIGS. 7-21, the light guide 60 comprises at least one side portion 57 defining the side wall 92 and a central portion 58 defining the side wall 90. These portions 57, 58 are therefore intended to form a shaped coupling to define the hollow seat 72. The side portion 57 of the light guide 60 is provided with first through holes 59 which open onto the hollow seat 72. These first through holes 59 of the side portion 57 of the light guide 60 are intended to house the output ends 52 of the optical fibres 44 facing the hollow seat 72. As illustrated in FIG. 9, the output ends 52 of the optical fibres 44 can be fastened to the side portion 57 with a head 62 of a screw inserted into a blind hole 63 in the first side portion 57 of the light guide 60. The head 62 of the screw then engages a protrusion 65 of the output end 52 of a diameter greater than that of the first through holes 59 of the side portion 57 of the light guide 60. The side portion 57 thus acts as a fibre-holder support 56. This side portion 57 is further provided with second through holes 66 that open onto the hollow seat 72 and are intended to house the pins 104. The side wall 90 of the central portion 58 of the light guide 60 has a step 67, on which one end of the pin 104 extends, once the pin 104 is inserted into a respective second through hole 66 of the side portion 57. The pins 104 fitted by interference in the second through holes 66 of the side portion 57 thus cross the entire hollow seat 72 of the light guide 60 remaining facing the respective output ends 52 of the optical fibres 44.

Advantageously, the height of the light guide 60 is lower than a conventional light guide, for the same pitch P for positioning the output ends 52 of the optical fibres 44, to the benefit of smaller encumbrance and weight. In fact, by increasing the opening angle β of the light beam reflected by the pins 104, the output ends 52 of the optical fibres 44 can be placed closer to the weld interface 28 thereby decreasing the height of the light guide 60.

The pin 104 may have different geometries. In one embodiment, the pin 104 has a circular or elliptical cylindrical section geometry. In other words, it is a cylindrical body with a main extension axis P-P and has, with respect to a cross-section plane perpendicular to the main extension axis P-P, a circular or elliptical geometry.

According to one embodiment, the pin 104 has a semi-cylindrical geometry, with a semi-circular or semi-elliptical cross-section having convexity facing the output end 52 of the optical fibre 44.

In other words, the convex portion of the pin faces the output end 52 of the optical fibre 44 so as to reflect the light beam towards the weld interface, expanding it.

According to one embodiment, the pin 104 is coated with a gold layer. Since the gold has an excellent reflectance, this coating amplifies the expansion effect along the direction substantially tangent to the curvilinear abscissa S defining the perimetral contour 76.

Preferably, the pin 104 has a diameter 108 greater than or equal to a diameter 110 of the output end 52 of the corresponding optical fibre 44.

Preferably the diameter 108 of the pin 104 is greater than a width 112 of the seat 72 of the light guide 60, said width 112 being the distance between the side walls 90, 92 of the light guide 60 which delimit the perimetral contour 76 in a radial direction R-R perpendicular to the curvilinear abscissa S-S.

The technical diffusion effect obtained by the pin 104 is schematically illustrated in FIGS. 21a-21b. In particular, it may be noted how the beam emitted from the output end 52 of the optical fibre 44 is incident on the pin 104 and is reflected by it towards the weld interface 28 with an opening angle β much greater than a which would be obtained with the optical fibre 44 only (FIG. 21b).

According to a possible embodiment as illustrated, for example, in FIGS. 15-20, the automotive headlight 4 simultaneously comprises both refractive diffusion portions 84 and reflexive diffusion portions 100.

Preferably, the reflexive diffusion portions 100 are positioned upstream of the refractive diffusion portions 84, relative to the weld interface 28, and the laser sources 32 are arranged in proximity to the reflexive diffusion portions 100.

In this way, the light beam produced by the laser sources 32 first encounters the reflexive diffusion portions 100, is reflected and expanded by the latter towards the refractive diffusion portions 84 that influence the beam incident thereon further expanding it. The doubly expanded beam is therefore free to be incident on the weld interface 28.

This hybrid system, i.e. comprising both refractive diffusion portions 84 and reflexive diffusion portions 100, ensures that no energy accumulations are formed within the container body 8 (absorbent material), under the weld interface 28. In fact, at a level below the weld interface 28, light beams could overlap giving rise to excessive heating of the resin and therefore to imperfect welding. Thus, it is possible to observe a synergistic effect due to the simultaneous use of reflexive diffusion portions 100, such as the pin 104, and refractive diffusion portions 84, such as the film 88, wherein the reflexive diffusion portions 100 contribute to widening the light beam in a direction tangential to the S-S curvilinear abscissa, while simultaneously the refractive diffusion portions 84 homogenize the laser radiation in depth.

Obviously, as seen, it is possible to provide embodiments comprising, as diffusion elements 80, only refractive diffusion media (FIGS. 1-7) or exclusively reflexive diffusion portions 100 (FIGS. 8-14).

The welding method of a vehicle light according to the present invention will now be described.

In particular, the simultaneous laser welding method of a vehicle light according to the present invention comprises the steps of:

providing at least one laser source 32, 34, each suitable to emit a light beam, providing a plurality of optical fibres 44, each optical fibre comprising an output end 52 and an input end 48, associating to each optical fibre 44 a respective laser source 32, 34, the input end 48 of each optical fibre 44 being respectively connected to an output of a laser source 32, 34, providing a fibre-holder support 56 to support the plurality of optical fibres 44, providing a placement support, providing a container body 8 delimited by a first perimetral profile 16, providing a lenticular body 20 delimited by a second perimetral profile 24, wherein the first and second perimetral profile 16, 24 of the container body 8 and of the lenticular body 20 are at least partially counter-shaped to each other so as to interface at a weld interface 28, attaching the container body 8 and the lenticular body 20 to the placement support, joining at least partially in contact with each other the respective first and second perimetral profiles 16, 24 of the container body 8 and of the lenticular body 20, blocking in predetermined positions said output ends 52 of the optical fibres 44 in the fibre-holder support 60, providing a light guide 60 in cascade to the fibre-holder support 56, the light guide 60 being provided with at least one seat 72 defining a perimetral contour 76 counter-shaped with respect to said weld interface 28 and housing the output ends 52 of the optical fibres 44 blocked in the fibre-holder support 56, preparing diffusion elements 80 that pass through the perimetral contour 76 of the seat 72 of the light guide 60 internally, so as to intercept and influence the light beams that propagate inside said seat 72, performing a simultaneous laser welding between the lenticular body 20 and the container body 8 at the weld interface 28 by activating the laser sources 32, 34 emitting light radiation transmitted by the lenticular body 20 and absorbed by the container body 8, where such light radiation impacts on the diffusion elements 80 which expand the light beams along a direction substantially tangent to a curvilinear abscissa S-S defining the perimetral contour 28, before it comes out of the light output wall 68 and/or at the latter.

As noted above, the diffusion elements 80 may include refractive diffusion portions 84 and/or reflexive diffusion portions 100.

The method may comprise the steps of diversifying the energy produced by the laser sources 32, 34 located along the weld interface 28. In this way, for example, the laser welding can be adapted and optimized to specific and complex three-dimensional geometries of the headlight and, in particular, of the weld interface 28.

It is also possible to provide for steps of staggering the turning on of at least two laser sources 32, 34 spread along the weld interface 28. Again, in this case too the welding can be optimized with respect to specific and complex three-dimensional geometries of the headlight and, in particular, of the weld interface 28.

This method may also comprise the steps of diversifying the energy produced by the laser sources 34 spread along the weld interface 28.

It is also possible to stagger the turning on of at least two laser sources 34 spread along the weld interface 28.

As may be appreciated from the description, the present invention makes it possible to overcome the drawbacks mentioned of the prior art.

In particular, it is possible to apply the simultaneous laser welding method quickly and inexpensively also to vehicle lights having any type of complex geometry, even with curvatures and thicknesses highly variable along the perimeter of the light.

In fact, the light guide of the invention is able to distribute the energy of the light beams evenly throughout the weld interface, completely nullifying the discrete distribution effect of the optical fibres, generating an energy distribution with a substantially straight and constant trend. As explained, the presence of refractive diffusion portions makes it possible to obtain the thermal peak precisely at the weld interface.

Moreover, the presence of reflective diffusion portions makes it possible to reduce overall the height and therefore the overall dimensions of the light guide compared to the solutions of the prior art.

Advantageously, the optical fibres are considerably spaced apart compared to an equivalent beam architecture of the prior art, and therefore are fewer in number to cover the same perimeter of weld interface.

This is made possible thanks to the provision of diffusion elements, whether reflective and/or refractive, as described.

In particular, the diffusion elements are able to widen the light beam coming from the fibres so as to cover a greater extension: therefore, it is possible to influence, that is, radiate, the entire welding perimeter with a smaller total number of laser sources and therefore of optical fibres.

In other words, it is possible to increase the pitch between adjacent fibres compared to the solutions of the prior art and thus reduce the overall costs of the welding equipment.

As described above and shown in the drawings, in fact, it is possible to switch from the current pitch or distance between optical fibres of 3-4 mm, up to a pitch of 30 mm. In other words, the pitch is substantially quadrupled compared to the prior solutions with optical fibre bundles. This means that, for the same extension of the weld interface, the total number of optical fibres to be used in the equipment can be reduced to at least a quarter.

In addition, the reduction in the number of optical fibres allows a significant reduction in power losses since the total number of optical fibres is reduced.

A person skilled in the art may make numerous modifications and variations to the welding equipment and welding method of vehicle lights described above so as to satisfy contingent and specific requirements while remaining within the sphere of protection of the invention as defined by the following claims.

The invention claimed is:

1. A simultaneous laser welding equipment for a vehicle light comprising:

a placement support for supporting a container body and a lenticular body of a vehicle light to be welded together at reciprocal perimetral profiles associated at a weld interface, at least one laser source suitable for emitting light beams, a plurality of optical fibres, each extending from an input end to an output end, the optical fibres being associated, at said input ends to said at least one laser source and being suitable to transmit said light beams, a light guide provided with at least one hollow seat having at least one light input wall, which receives the light beams coming from the output ends of the optical fibres and a light output wall which sends the light beams towards the weld interface, wherein the seat of the light guide delimits a continuous perimetral contour, counter-shaped to said weld interface, wherein the light guide includes diffusion elements that pass through said perimetral contour of the seat of the light guide internally, so as to intercept and influence the light beams that propagate inside said seat, the diffusion elements being shaped to expand the light beams along a direction substantially tangent to a curvilinear abscissa defining said perimetral contour, before it projects from the light output wall and/or at the latter; and wherein said diffusion elements include reflective diffusion portions which reflect and expand the light beams incident upon them, said reflective diffusion portions including at least one pin placed facing the output end of each corresponding optical fibre and said pin is oriented so that a line N perpendicular to the pin identifies, with an optical axis F of the corresponding optical fibre, an angle of incidence $\gamma$ between 25 and 65 degrees, wherein the optical axis is a main axis of symmetry and propagation of the light beam emitted by the laser source.

2. The simultaneous laser welding equipment of a vehicle light as set forth in claim 1, wherein said diffusion elements include refractive diffusion portions, made of a material having a different refractive index with respect to a filler medium that fills the perimetral contour of the seat and suitable to be crossed by the light beams incident on it.

3. The simultaneous laser welding equipment of a vehicle light as set forth in claim 2, wherein said filler medium comprises air.

4. The simultaneous laser welding equipment of a vehicle light as set forth in claim 2, wherein said filler medium comprises a plastic material such as polycarbonate.

5. The simultaneous laser welding equipment of a vehicle light as set forth in claim 2, wherein said refractive diffusion portions include a film of polymer material transparent to the light beam and having a different refraction index to the refraction index of the filler medium of the perimetral contour of the seat.

6. The simultaneous laser welding equipment of a vehicle light as set forth in claim 5, wherein said film comprises a plurality of optics that expand the light beams incident thereon.

7. The simultaneous laser welding equipment of a vehicle light as set forth in claim 6, in which the film is anisotropic, wherein said optics are micro-optics oriented so as to expand the light beams according to a direction of diffusion substantially tangent to said curvilinear abscissa along the entire perimetral contour.

8. The simultaneous laser welding equipment of a vehicle light as set forth in claim 7, wherein said anisotropic film comprises a plurality of segments, provided with said micro optics and arranged seamlessly, each tangent to a section of the weld interface in order to entirely trace the perimetral contour.

9. The simultaneous laser welding equipment of a vehicle light as set forth in claim 5 in which the light guide has a pocket which extends inside the light guide in order to trace a perimeter of the weld interface, and wherein the film is placed inside said pocket so to cross the entire hollow seat of the light guide.

10. The simultaneous laser welding equipment of a vehicle light as set forth in claim 5, wherein the hollow seat is entirely interrupted by the film, so that a ray of the light beam propagated inside the hollow seat of the light guide is influenced by said film.

11. The simultaneous laser welding equipment of a vehicle light as set forth in claim 5, wherein the film is placed so as to interrupt and fully close the hollow seat.

12. The simultaneous laser welding equipment of a vehicle light as set forth in claim 5, wherein the film is placed at a distance greater than 3 cm from the output end of the optical fibres.

13. The simultaneous laser welding equipment of a vehicle light as set forth in claim 1, wherein said pin is positioned so that the output end is interposed between the pin and the weld interface so as to reflect towards the weld interface the light beam incident on it.

14. The simultaneous laser welding equipment of a vehicle light as set forth in claim 1, wherein said pin has a cylindrical geometry with a circular or elliptical cross-section.

15. The simultaneous laser welding equipment of a vehicle light as set forth in claim 1, wherein said at least one pin has a semi-cylindrical geometry, with a semi-circular or semi-elliptical cross-section, having convexity facing said output end of the optical fibre.

16. The simultaneous laser welding equipment of a vehicle light as set forth in claim 1, wherein said pin comprises an outer layer of coating in gold.

17. The simultaneous laser welding equipment of a vehicle light as set forth in claim 1, wherein said pin has a diameter greater than a width of the seat of the light guide, said width being the distance between side walls of the light guide which delimit the perimetral contour in a radial direction perpendicular to said curvilinear abscissa.

18. The simultaneous laser welding equipment of a vehicle light according to claim 1, wherein said diffusion elements include both refractive diffusion portions and reflective diffusion portions.

19. The simultaneous laser welding equipment of a vehicle light as set forth in claim 18, wherein the reflective diffusion portions are positioned upstream of the refractive diffusion portions and wherein the laser sources are arranged in the vicinity of the reflective diffusion portions.

20. The simultaneous laser welding equipment of a vehicle light as set forth in claim 1, wherein the seat of the light guide is delimited by side walls which are flat and parallel to each other with respect to a cross-section plane perpendicular to a curved abscissa defining said perimetral contour.

21. The simultaneous laser welding equipment of a vehicle light as set forth in claim 1, wherein the seat of the light guide is delimited by side walls which are flat and divergent from each other, moving away from the output end of each optical fibre with respect to a cross-section plane perpendicular to a curved abscissa defining said perimetral contour.

22. The simultaneous laser welding equipment of a vehicle light as set forth in claim 1, wherein the output ends of the optical fibres are spaced apart from each other by a pitch between 10 and 40 mm.

23. The simultaneous laser welding equipment of a vehicle light as set forth in claim 1, wherein said laser sources comprise laser diodes.

24. The simultaneous laser welding equipment of a vehicle light as set forth in claim 1, wherein each laser source is associated at its input end with a single optical fibre so as to receive, channel and transmit towards the weld interface, the light beam produced by a single corresponding laser source.

25. The simultaneous laser welding equipment of a vehicle light as set forth in claim 1, wherein the simultaneous laser welding equipment comprises at least one laser source associated with a bundle of fibre optics which branch off along the weld interface.

26. The simultaneous laser welding equipment of a vehicle light as set forth in claim 1, comprising a fibre support device to support the optical fibres, suitable to block in predetermined positions, said output ends of the optical fibres.

27. The simultaneous laser welding equipment of a vehicle light as set forth in claim 1, wherein the light guide comprises at least one side portion having a side wall, and a central portion defining a side wall, said portions forming a shaped coupling to define the hollow seat, said side portion forming a support for an attachment of said output ends of the fibres.

\* \* \* \* \*